US010914291B2

(12) United States Patent
Nielsen

(10) Patent No.: US 10,914,291 B2
(45) Date of Patent: Feb. 9, 2021

(54) ANNUAL ENERGY PRODUCTION OF WIND TURBINE SITES

(71) Applicant: VESTAS WIND SYSTEMS A/S, Aarhus N (DK)

(72) Inventor: Michael Pram Nielsen, Højbjerg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 9 days.

(21) Appl. No.: 16/464,519

(22) PCT Filed: Nov. 13, 2017

(86) PCT No.: PCT/DK2017/050372
§ 371 (c)(1),
(2) Date: May 28, 2019

(87) PCT Pub. No.: WO2018/095494
PCT Pub. Date: May 31, 2018

(65) Prior Publication Data
US 2019/0277257 A1    Sep. 12, 2019

(30) Foreign Application Priority Data
Nov. 28, 2016   (DK) .................................. 2016 70940

(51) Int. Cl.
F03D 17/00    (2016.01)
F03D 7/04     (2006.01)
F03D 7/02     (2006.01)

(52) U.S. Cl.
CPC ............. *F03D 17/00* (2016.05); *F03D 7/028* (2013.01); *F03D 7/048* (2013.01);
(Continued)

(58) Field of Classification Search
CPC ...................................................... F03D 17/00
See application file for complete search history.

(56) References Cited

U.S. PATENT DOCUMENTS 6,320,272 B1* 11/2001 Lading .................. F03D 7/0224
290/44
6,946,751 B2*  9/2005 Yoshida ................ F03D 7/0204
290/43
(Continued)

FOREIGN PATENT DOCUMENTS

EP       0970308 A1    1/2000
WO    2018095494 A1    5/2018

OTHER PUBLICATIONS

European Patent Office Examination for Application No. 17 800 383.6-1007 dated Apr. 24, 2020.
(Continued)

*Primary Examiner* — Woody A Lee, Jr.
(74) *Attorney, Agent, or Firm* — Patterson + Sheridan, LLP

(57) ABSTRACT

A method of estimating the energy production of a wind turbine or group of wind turbines is described. The method comprises obtaining, from a climate library, climate data in respect of a selected geographical location, the climate data comprising wind speed and direction at the selected geographical location, generating a plurality of power curves, each power curve defining a power output of a wind turbine as a function of wind speed for a particular climatic condition or range of climatic conditions, and estimating an energy production for the wind turbine or group of wind turbines using the generated power curves and wind speed data.

17 Claims, 2 Drawing Sheets

(52) U.S. Cl.
CPC . *F05B 2260/821* (2013.01); *F05B 2260/8211* (2013.01); *F05B 2260/84* (2013.01); *F05B 2270/1033* (2013.01); *F05B 2270/32* (2013.01); *F05B 2270/321* (2013.01); *F05B 2270/404* (2013.01)

(56) References Cited

U.S. PATENT DOCUMENTS

| | | | | |
|---|---|---|---|---|
| 7,347,667 | B2* | 3/2008 | Wobben | F03D 7/0204 416/1 |
| 7,476,985 | B2* | 1/2009 | Llorente Gonzalez | F03D 7/0264 290/44 |
| 7,823,437 | B2* | 11/2010 | Siebers | G01P 5/07 73/1.37 |
| 2011/0040550 | A1 | 2/2011 | Graber et al. | |
| 2014/0365187 | A1 | 12/2014 | Guzman et al. | |
| 2016/0230741 | A1 | 8/2016 | Brath et al. | |
| 2016/0298607 | A1 | 10/2016 | Gregg et al. | |

OTHER PUBLICATIONS

Cetinay Hale et al, "Optimal Siting and Sizing of Wind Farms," Renewable Energy, vol. 101, pp. 51-28.

Danish Patent and Trademark Office First Technical Examination for Application No. 2016P00136DK JJ dated May 30, 2017.

PCT Notification of Transmittal of The International Search Report and the Written Opinion of the International Searching Authority, or the Declaration for Application No. PCT/DK2017/050372 dated Aug. 2, 2018.

Anonymous,"Guide to the Wind Turbine Power Calculator," Jun. 1, 2003,Retrieveci from the Internet: URL:http://dr0mst0rre.dk/wp-content/wind/miller/windpower%20web/en/tour/wres/guidep.htm [retrieved on Jan. 31, 2018] paragraphs [0001]-[8005].

Troen et al: 11 European Wind Atlas 111' Jan. 1989 (Jan. 1, 1989), p. 1-119,564-653.

* cited by examiner

ANNUAL ENERGY PRODUCTION OF WIND TURBINE SITES

FIELD OF THE INVENTION

The present invention relates to improving the annual energy production of wind turbine sites. More particularly, the invention relates to methods of generating climate specific power curves for wind turbines, predicting the annual energy production of proposed wind turbine sites based on the climate specific power curves, and tuning turbine controllers in view of local wind conditions based on the climate specific power curves to improve the power output of those wind turbines and thus the annual energy production of the site.

BACKGROUND TO THE INVENTION

Wind turbines comprise a fixed tower which stands on the ground or sea bed, and a nacelle which rests on the top of the tower and carries a turbine shaft, a gearbox, a brake, a generator, a blade pitch controller which controls the angle of the turbine blades, and a yaw drive which controls the position of the wind turbine relative to the wind. Turbine blades are mounted to the turbine shaft externally of the nacelle. The turbine blades cause the shaft to rotate under the influence of wind, which in turn drives the generator to generate electrical power. The pitch of the blades is controlled by the blade pitch controller. The pitch of the blade is adjusted by rotating each blade around its axis in order to change its angle of attack to the wind. Changing the pitch of the blade is a useful technique for limiting peak power, optimizing rotor efficiency, and slowing down the rotor.

At a particular site, a wind park comprising a plurality of wind turbines may be provided. These sites are selected having regard to a number of factors, including local wind conditions (for example average wind speed). A wind turbine converts the kinetic energy of the wind (which is a function of mass and velocity) into electrical energy. It will be appreciated that wind conditions, and most particularly wind speed, have a significant influence on the amount of kinetic energy available for conversion into electrical energy, since the faster the wind the more energy it contains. Average wind speed at a proposed site is an important parameter. In addition, the manner in which the wind speed varies is also an important parameter. In predicting an amount of energy available for extraction from the wind, it is therefore useful to consider the amount of time the wind spends at different wind speeds, that is the wind speed distribution. The most common measure of wind speed distribution is the Weibull probability distribution. This has a shape factor, k, and a scale factor λ. In order to use a Weibull probability distribution to estimate a distribution of wind speeds, an average windspeed and a k factor are required.

Traditionally, candidate wind farm sites have been assessed by establishing towers at the sites and using the towers (which are equipped with wind speed and direction measuring equipment) to measure wind speed and direction over an extended period of time (months or years). In addition to the wind speed distribution, a power curve is available for any given wind turbine. This power curve represents the power output of the wind turbine as a function of wind speed. By utilising the power curve and the wind speed distribution together, it is possible to determine a theoretical annual energy production (AEP) for a given turbine at that site. Total theoretical annual energy production for the site can then be determined by summing the results for all turbines (or multiplying by the number of turbines if all turbines are the same and if a single wind speed distribution is used for all positions on the site). One way of doing this is simply to multiply the power output at each wind speed by the amount of time spent at that wind speed, and then to sum the results. The theoretical annual energy production can then be adjusted to factor in various considerations such as air temperature, turbine down-time (for maintenance/repair), site down-time (loss of connection to grid), and electrical losses at the site.

It is against this background that the invention has been devised.

SUMMARY OF THE INVENTION

In a first aspect, the invention provides a method of estimating the energy production of a wind turbine or group of wind turbines, the method comprising:

obtaining, from a climate library, climate data in respect of a selected geographical location, the climate data comprising wind speed and direction at the selected geographical location;

generating a plurality of power curves, each power curve defining a power output of a wind turbine as a function of wind speed for a particular climatic condition or range of climatic conditions; and estimating an energy production for the wind turbine or group of wind turbines using the generated power curves and wind speed data.

The energy production may be estimated by weighting the contribution of each power curve in accordance with the expected relative frequency of the climatic conditions to which those power curves relate.

The wind speed data used in the estimating step may be based on wind speed measurements taken at the selected geographical location. The wind speed measurements may be measurements of wind speed and direction taken at a particular height using a met mast at the selected geographical location.

The wind speed data used in the estimating step may be obtained from the climate library.

The obtained climate data may comprise wind speed and direction at a plurality of different heights above the surface.

The climate library may be generated from a weather model describing weather conditions as a function of geographical location, the weather model being generated from weather observations. The climate library may store, in relation to each of a plurality of geographical positions, historical climate data as a function of time, the method comprising clustering the wind speeds and directions of the climate data into a plurality of groups based on similarity, each group being represented by a representative wind speed and/or direction profile.

The method may further comprise determining a relative frequency of each of the representative wind speed and/or direction profiles.

The method may further comprise determining a power curve for each of the representative wind speed and/or direction profiles. In this case, each power curve may be determined by inputting a respective wind speed and/or direction profile into a wind turbine simulator.

The method may further comprise determining a weighted power curve by combining the power curves for each of the wind speed and/or direction profiles in accordance with their relative frequencies, the energy production being calculated using the weighted power curve.

The step of determining the power curve for each wind speed and/or direction profile may be conducted based in part on wind speed and/or direction measurements taken directly from a selected geographical location.

The method may comprise selecting one or more controller settings for operating a wind turbine by generating power curves for each of a plurality of candidate controller settings and selecting the controller settings which result in a most favourable power output for the turbine.

In a second aspect, the invention comprises a wind turbine having a controller operating in accordance with the controller settings obtained by the above method.

In a third aspect, the invention comprises an apparatus for calculating energy production for a wind turbine or group of wind turbines, comprising retrieval means for obtaining, from a climate library, climate data in respect of a selected geographical location, the climate data comprising wind speed and direction at the selected geographical location; and a processor for generating a plurality of power curves, each power curve defining a theoretical power output of a wind turbine as a function of wind speed for a particular climatic condition or range of climatic conditions, and for estimating an energy production for the wind turbine or group of wind turbines using the generated power curves and wind speed data.

In a fourth aspect, the invention comprises a method of optimising operating parameters of a wind turbine by detecting a maximum of an estimated energy production as a function of the operating parameters, wherein the estimated energy production is determined using a method as defined above.

In a fifth aspect, the invention comprises a method of determining if a wind turbine is being operated optimally, comprising comparing a measured energy production of the wind turbine with an estimated energy production determined using a method as defined above.

The invention may be embodied as a computer program product carrying a computer program which when executed on a data processing apparatus will cause the data processing apparatus to perform a method as defined above.

It will be appreciated that the method defined above and described below may make it possible to increase the accuracy of an AEP estimate by using wind speed and wind direction profile information taken from a weather model optionally combined with the climatic conditions measured on site. Using weather model mesoscale data makes it possible to estimate information on the flow field in heights above what has been conventionally measured on the site. Moreover, generally measurements are typically taken only at one or two heights, whereas a greater degree of resolution may be possible by utilising the weather model. Having information on the flow field for the entire rotor area is valuable in making an accurate estimate of the turbine AEP. Further, knowing the properties of the flow field also makes it possible to tune the turbine controller to the specific climatic conditions to increase the power output and therefore improve AEP.

DETAILED DESCRIPTION OF EMBODIMENTS OF THE INVENTION

Figure 1:
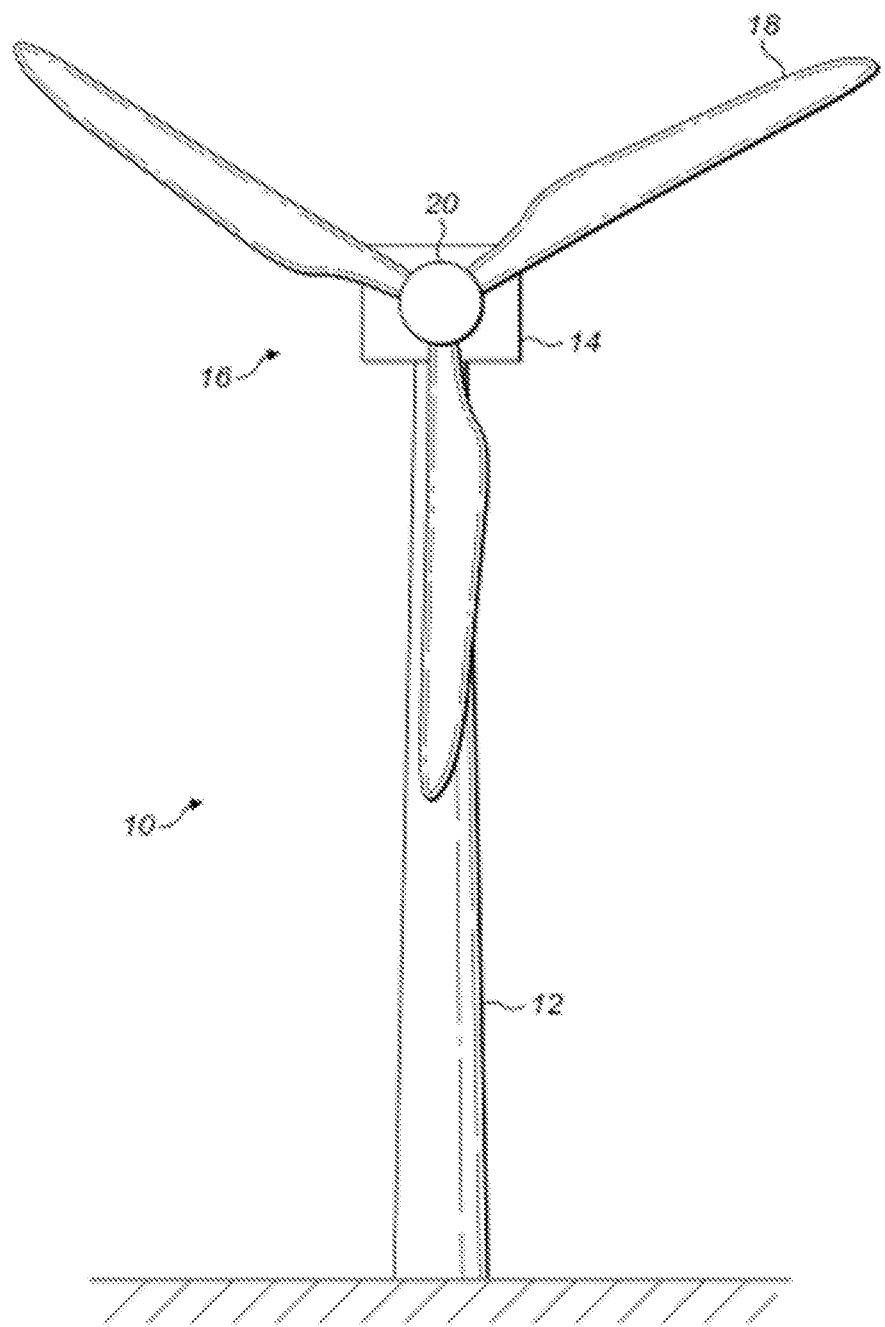
FIG. 1 is a schematic view of a wind turbine system.

FIG. 1 shows a wind turbine 10 comprising a tower 12 supporting a nacelle 14 to which a rotor 16 is mounted. The rotor 16 comprises a plurality of wind turbine blades 18 that extend radially from a central hub 20. In this example, the rotor 16 comprises three blades 18. As discussed above, the pitch (angle of attack with respect to the wind) of the wind turbine blades 18 can be adjusted by a blade pitch controller (not shown), while the yaw of the nacelle 14 can be adjusted by a yaw drive (not shown) to face generally into the wind. The rotor 16 is mounted on a main bearing (not shown), which permits the rotor to rotate freely about its axis. The wind turbine blades 18 are each mounted to the rotor via blade bearings (not shown), which permit the blade 18 to rotate about their longitudinal axis to adjust their pitch. It will be understood that many such wind turbines can be established in a site, or wind farm, covering an area of several square kilometres.

Figure 2:
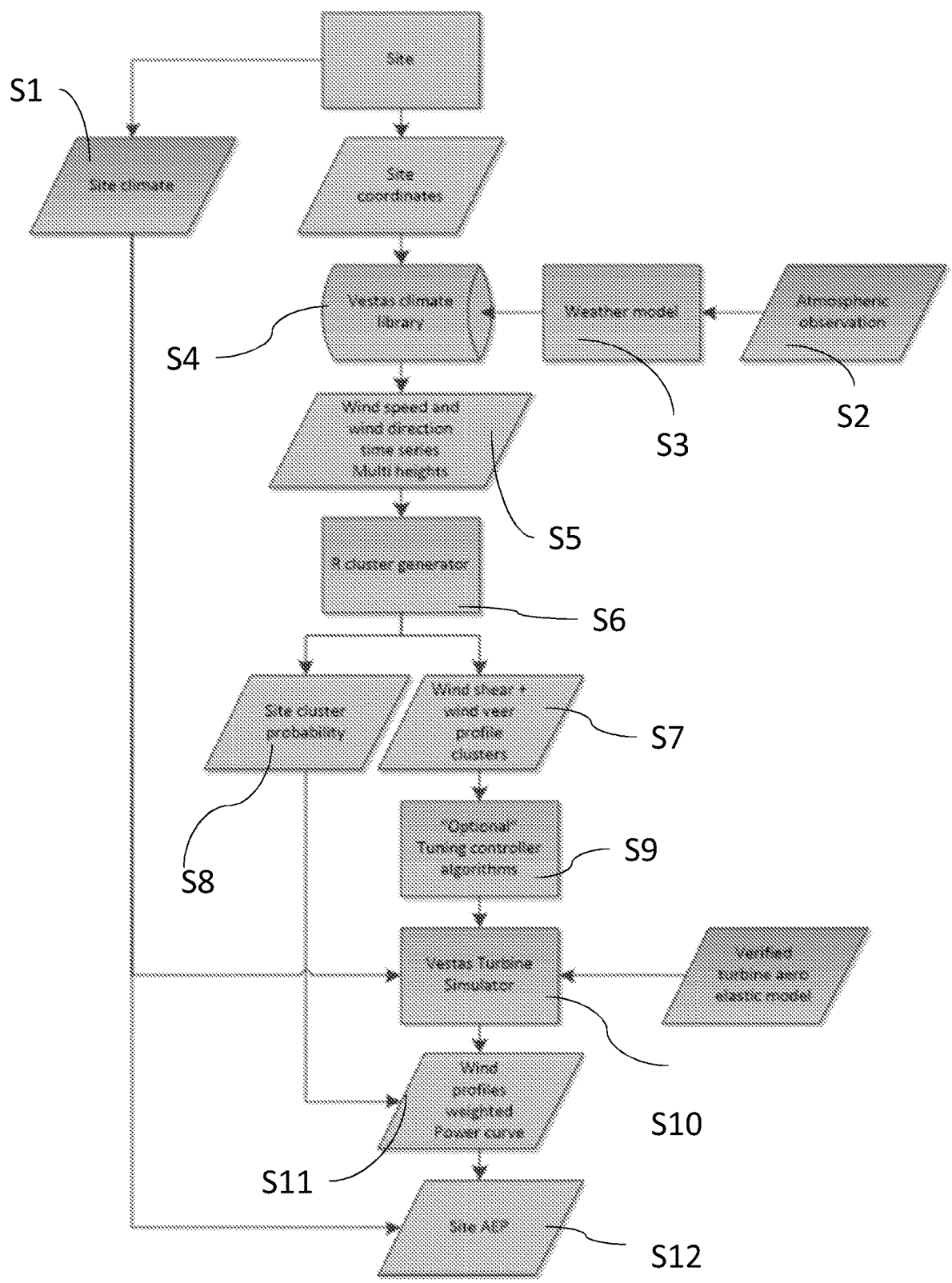
FIG. 2 is a schematic flow diagram of a method of generating a climate specific power curve for wind turbines, and for predicting the annual energy production of a proposed (or actual) wind turbine site.

FIG. 2 shows a method of determining a climate specific power curve, and optionally of determining the annual energy production of a turbine or wind farm based on such a climate specific power curve, and further optionally of tuning wind turbine controller settings to take into account local climate. At a step S1, local climate measurements are made at a proposed or actual wind farm site. These measurements can be made in the usual way utilising masts bearing wind measuring instrumentation at one or more heights above the ground. The site climate is extracted from the physical climate conditions measured on site with met masts or other measuring devices. The site climatic conditions describe the air density, inflow angles, wind shear, turbulence intensity and wind distribution Weibull A and k parameters on all met mast positions (or turbine positions in the case of applying the invention to an existing site). The measurements may take place over the course of weeks, months or years, building up a data set of climate measurements for that site. The ways in which these measurements and parameters are used in the present technique are described below.

Prior to, or in parallel with the step S1, at a step S2 atmospheric observations take place. It should be understood that the state of the Earth's atmosphere, land, and ocean surface, as well as the Earth's physiographical properties, has been consistently monitored during the last several decades. The data is being collected, stored, and processed at a number of public weather services and agencies in order to produce a physically, spatially, and temporally consistent atmospheric analysis. This represents the closest available digital representation of the true state of the atmosphere at every point in time and space. At a step S3, these observations are used to generate a weather model. The weather model is a system of partial differential equations, describing relevant physical processes in the atmosphere resulting in what is perceived as weather. These equations are numerically solved using a supercomputer, and the solutions are represented as series of numbers, maps, or otherwise, as convenient. At a step S4, a climate library is built based on the weather model. The climate model is a collection of weather model results, represented as data points covering preferably the whole globe at various spatial resolutions (the distance between neighbouring data points on the Earth's surface), with at least one-hour frequency, and for the time period of at least the last 16 years. A set of hardware and software solutions are also provided that enable fast retrieval, processing and interpretation of climate library data.

The climate model may be the well-known WRF (Weather Research and Forecasting) model or a modified version thereof. The WRF model describes atmospheric phenomena between global scales covered by global weather models and the microscale phenomena which can be modelled by computational fluid dynamics (CFD). The level of modelling resolution is well suited to describing trends in wind behaviour on the temporal and spatial scales relevant for the present purposes. The WRF model is run with 62 vertical levels, 17 of which are within the lowest kilometre above the surface. Several of these levels (referenced below) fall within the vertical range relevant to the function of a wind turbine. The climate model output contains modelled wind speed, wind direction, air temperature and density values derived from the model simulation in the 62 vertical levels.

The WRF model is a commonly used, and scientifically well documented model which has been developed by the National Center for Atmospheric Research (NCAR), the National Oceanic and Atmospheric Administration (NOAA), the National Center for Environmental Prediction (NCEP), the Forecast Systems Laboratory (FSL), the Air Force Weather Agency (AFWA), the Naval Research Laboratory, the University of Oklahoma and the Federal Aviation Administration (FAA). The advantage of the WRF model is the description of atmospheric phenomena between the global scales covered by global weather models (macro and synoptic scales) and the microscale phenomena, resolved by very detailed models, like CFD models. A good understanding of Mesoscale atmospheric process is important in the process of mapping wind speeds and other meteorological key drivers for the wind power potential in a geographical region. Mesoscale data is able to capture the general trends in the wind behaviour on all temporal scales relevant for the wind resource distribution. The WRF model provides detailed climate information on an hourly basis from January 2000 to present. The data is utilised to create maps and statistics illustrating spatial and temporal variability in wind speed and other key drivers of the wind energy production. This can be used to identify areas where the wind resource may be suitable for wind power plants.

A nested grid layout enables capturing the effects of synoptic weather events on the wind resource, the most energetic mesoscale motions, and local climate conditions by simulating the effect of local terrain and local scale atmospheric circulations, all in one consistent model setup. The WRF model is initialised every 48 hours using data from the Global Forecast System (GFS) Analysis with boundary conditions updated every 6 hours. Since January 2000, the National Center for Environmental Predication (NCEP) has maintained the GFS databases, which provided gridded analysis datasets by assimilating observations from satellite, airborne data, and ground-based instruments on a horizontal grid of 1° by 1° at 6 hour intervals. At a step S5, the site coordinates, describing the exact geographical positions of at least the site itself, and preferably of all wind turbines and met masts on site, are used to extract relevant climate data from the climate library corresponding to the geographical position of the actual or proposed site and preferably of all proposed turbine locations on that site. The climate data in this case is wind speed and wind direction time series data at multiple heights. In particular, at any chosen geographical location (e.g. the position of each turbine or proposed turbine position), the wind speed and wind direction data can be extracted from the climate library, and be organized into a time-series of the two variables (wind speed and wind direction) describing the wind conditions at a series of heights above the surface, for example at 20 m, 40 m, 60 m, 80 m, 100 m, 120 m, 140 m, 160 m, 180 m, and 200 m. The time series data may represent any meaningful interval, such as every hour or every day, and may have a range of months or years for example. The heights can be expected to cover the full vertical extent of turbine rotor blades. It will be appreciated that this information can be used to identify wind shear, that is the difference in wind speed and/or direction as a function of height. Wind shear can have a significant impact on turbine power output. An array of wind speed data values (for example in m/s) and preferably also wind direction (in degrees from North) with respect to height at any given time is considered to be a wind speed and/or direction profile. These can be considered as a single (combined) profile, or as separate wind speed profiles and wind direction profiles. It will therefore be appreciated that there is a single wind speed profile and/or wind direction profile for each time point (e.g. for every one-hour period in the data set) and for each geographical location (e.g. for each turbine position).

At a step S6, in relation to a turbine position, the wind speed and wind direction profiles across all time points are grouped, based on similarity identified through statistical clustering process (r clustering in this case, although other clustering algorithms could also be used). The clustering is conducted with respect both to wind speed and also wind shear (that is, differences in wind speed and/or direction with respect to height), and in particular so that profiles having similar wind speeds and wind shears are grouped together. Based on this a limited number of representative wind speed and wind direction profiles are created. For example, the profiles could be clustered into five groups, each represented by a representative wind speed and/or direction profile.

There are two primary outputs of the cluster generation process. Firstly, at a step S7, the representative wind speed and direction profiles are output. And secondly, at a step S8 a relative frequency (or probability of occurrence) of each of the wind speed and direction profiles is output. It will be understood that, depending on the site climate conditions, each representative wind speed and wind direction profile, created by the R cluster generation step, occurs with a specific frequency (by this we mean either that profile or a related profile within the same cluster occurs).

It will be appreciated that wind profiles within the same cluster can be expected, due to their similarity in terms of wind speed and shear, to have similar effects on turbine power output. In contrast, it can be expected that wind profiles from different clusters can generally be expected, due to their differences in terms of wind speed and shear, to have different effects on turbine power output.

At a step S9, optional tuning controller algorithms may be used to determine the way the turbine reacts to the wind conditions. The controller can be tuned using a specific set of climate conditions to optimize the power output of the turbine for these specific conditions. Using the wind speed profiles, wind direction profiles, inflow angles, turbulence intensity and air density the controller can be optimized for the specific site conditions. The optimisation may be carried out by use of the turbine simulator (see below). The optimisation may be carried out by optimising the power output of the turbine and at the same time ensuring that the load does not exceed a predetermined value. Further explanation of the tuning will be given below.

At a step S10 a turbine simulator, which is an aero elastic code used to simulate the aerodynamic and structural response of a wind turbine when exposed to specific wind conditions, is used to simulate turbine performance based on the representative wind profile, and optionally based on one or more settings specified by the tuning step. The turbine model has been verified to ensure that it can reproduce the structural loading and the power production of the turbine in real life, and contains a controller algorithm identical to that of the real turbine and will thus react to the climate in substantially the same way as the real turbine. Using the clustered wind speed profiles and wind direction profiles from the climate library together with the site measured (or determined from site measurements) inflow angles, turbulence intensity and air density collected at the step S1, the power output of the turbine can be simulated for the site climate conditions. The climatic conditions inputs are used by modifying the wind field that is given as input to the simulations. For example, for air density, it will be appreciated that the power generated by the turbine is linearly dependent on the air density, and that air density thus is used as an input to the turbine model. Inflow angles are the vertical flow angles of the wind in relation to the rotor-plane, which are also used as an input to the turbine model. Turbulence density is a (dimensionless) measure of the turbulence at the measurement location, and again is used as an input to the turbine model. The output of the step S10 is a climate specific power curve for each of the clusters/representative wind profiles.

At a step S11, a weighted power curve is generated from the climate specific profiles obtained from the simulations of the different climatic conditions, and the probability/frequency of occurrence of those wind profiles occurring. In particular, a weighted power curve can be calculated that is representative for the overall site climate conditions and the turbine response to the climatic input. By way of explanation, if 5 climate specific wind profiles A, B, C, D and E are generated by clustering, with a relative frequency of 0.4, 0.3, 0.2, 0.07, 0.03 respectively, then the resulting weighted power curve will be weighted in accordance with those relative frequencies, such that (for example) wind profile A has a greater contribution to the weighted power curve than wind profile B.

At a step S12, from the site wind distribution Weibull A and K parameters collected at the step S1 and the weighted power curve generated at the step S11 the AEP is calculated as if using a conventional turbine power curve. However, the resulting AEP can be expected to be more accurate than an AEP computed using conventional power curves, since rather than being calculated based on a power curve which simply assumes standard climatic conditions (with any climatic variance being factored in afterwards), the present technique uses power curves which are specific to the expected local climate.

The tuning of the wind turbine controller described above may be performed by running the turbine model using different settings of the turbine, and calculating a different AEP for each of the different settings. The settings which gave rise to the highest AEP when run through the model are then used in the operational turbine. It will be appreciated in this case that there will be multiple different power curves for each representative wind profile—one for each different turbine controller configuration. In relation to each different turbine controller configuration, the respective power curves (for each representative wind profile) are then combined into a weighted power curve as described above. The weighted power curve for each controller configuration is then used to compute the AEP for that controller configuration, and the configuration with the highest AEP is then selected for operational use. Various controller settings could be envisaged. One of these is blade pitch. In particular, where wind shear exists across the vertical extent of the turbine blades, modifying the blade pitch at different positions about the rotation of the blades may alleviate the effects of wind shear. The appropriate amount and timing of the blade pitch adjustments about the path of the blades may vary as a function of wind speed and/or shear, and so different settings may result in different AEP values when these settings are applied to the model. It would also be possible to modify the load settings of an individual turbine based on the site specific power curve. Generally it is desirable to optimise the power and minimise the load of a particular turbine.

It will be appreciated that different climatic conditions may apply at different parts of a site. Where the spatial resolution of the climate library is adequate, the steps S4 to S13 may be carried out in respect of each wind turbine (or potential wind turbine position) at the site, or to each of several groups of wind turbines (or potential wind turbine positions) at the site. In this case each wind turbine (or group) may be represented by their own one or more power curves, and their own AEP metric. An AEP metric for the entire site can then be calculated by summing the AEPs for all turbines/groups.

In some cases, multiple weighted power curves could be used in determining the AEP. For example, a power curve for high turbulence and a power curve for low turbulence could be computed (each of which is generated from a climate model having regard to wind speed and shear, as described above). Then, if the proportion of time spent at each turbulence level is known, it is possible to arrive at an AEP which factors in turbulence. For example, if it is possible to assume that during the day the amount of turbulence will be high, and at night the amount of turbulence will be low. The AEP can then be obtained by weighting the contribution of the "high turbulence" and "low turbulence" power curves in accordance with the relative frequency of day to night over the course of a year.

It will be appreciated that the climate specific power curve described above may comprise one or more power curves for specific wind turbines which at least to some extent address the effect of wind shear, turbulence and density of the air on the power curve.

The invention claimed is:
1. A method, comprising:
obtaining, from a climate library, climate data in respect of a selected geographical location, the climate data comprising wind speed and direction at the selected geographical location, wherein the climate library stores, in relation to each of a plurality of geographical positions, historical climate data as a function of time;
clustering the wind speeds and directions of the climate data into a plurality of groups based on similarity, each group being represented by a representative wind speed or direction profile;
generating a plurality of power curves, each power curve defining a power output of a wind turbine as a function of wind speed for a particular climatic condition or range of climatic conditions;
estimating an energy production for the wind turbine using the generated power curves and wind speed data; and
tuning the wind turbine based on the plurality of power curves.

2. The method according to claim 1, wherein the energy production is estimated by weighting the contribution of each power curve in accordance with the expected relative frequency of the climatic conditions to which those power curves relate.

3. The method according to claim 1, wherein the wind speed data used in the estimating step is based on wind speed measurements taken at the selected geographical location.

4. The method according to claim 3, wherein the wind speed measurements are measurements of wind speed and direction taken at a particular height using a met mast at the selected geographical location.

5. The method according to claim 1, wherein the wind speed data used in the estimating step is obtained from the climate library.

6. The method according to claim 1, wherein the obtained climate data comprises wind speed and direction at a plurality of different heights above the surface.

7. The method according to claim 1, wherein the climate library is generated from a weather model describing weather conditions as a function of geographical location, the weather model being generated from weather observations.

8. The method according to claim 1, comprising determining a relative frequency of each of the representative wind speed or direction profiles.

9. The method according to claim 1, comprising determining a power curve for each of the representative wind speed and/or direction profiles.

10. The method according to claim 9, wherein each power curve is determined by inputting a respective wind speed or direction profile into a wind turbine simulator.

11. The method according to claim 9, comprising determining a weighted power curve by combining the power curves for each of the wind speed or direction profiles in accordance with their relative frequencies, the energy production being calculated using the weighted power curve.

12. The method according to claim 1, wherein the step of determining the power curve for each wind speed or direction profile is conducted based in part on wind speed or direction measurements taken directly from a selected geographical location.

13. The method according to claim 1, comprising selecting one or more controller settings for operating a wind turbine by generating power curves for each of a plurality of candidate controller settings and selecting the controller settings which result in a most favourable power output for the turbine.

14. The method of claim 1, further comprising:
optimising operating parameters of a wind turbine by detecting a maximum of the estimated energy production as a function of the operating parameters.

15. The method of claim 1, further comprising:
comparing a measured energy production of the wind turbine with the estimated energy production.

16. An apparatus for calculating energy production for a wind turbine or group of wind turbines, comprising
retrieval means for obtaining, from a climate library, climate data in respect of a selected geographical location, the climate data comprising wind speed and direction at the selected geographical location, wherein the climate library stores, in relation to each of a plurality of geographical positions, historical climate data as a function of time; and
a processor for:
clustering the wind speeds and directions of the climate data into a plurality of groups based on similarity, each group being represented by a representative wind speed or direction profile;
generating a plurality of power curves, each power curve defining a theoretical power output of a wind turbine as a function of wind speed for a particular climatic condition or range of climatic conditions;
estimating an energy production for the wind turbine or group of wind turbines using the generated power curves and wind speed data; and
tuning the wind turbine based on the plurality of power curves.

17. A computer program product carrying a computer program which when executed on a data processing apparatus will cause the data processing apparatus to perform an operation, comprising:
obtaining, from a climate library, climate data in respect of a selected geographical location, the climate data comprising wind speed and direction at the selected geographical location, wherein the climate library stores, in relation to each of a plurality of geographical positions, historical climate data as a function of time;
clustering the wind speeds and directions of the climate data into a plurality of groups based on similarity, each group being represented by a representative wind speed or direction profile;
generating a plurality of power curves, each power curve defining a power output of a wind turbine as a function of wind speed for a particular climatic condition or range of climatic conditions;
estimating an energy production for the wind turbine using the generated power curves and wind speed data; and
tuning the wind turbine based on the plurality of power curves.

* * * * *